United States Patent
Haben et al.

(10) Patent No.: US 7,066,986 B2
(45) Date of Patent: Jun. 27, 2006

(54) APPARATUS FOR USE IN REGENERATING ADSORBENT

(75) Inventors: Christopher Richard Haben, Woking (GB); Mohammad Ali Kalbassi, Weybridge (GB); Declan Patrick O'Connor, Chessington (GB)

(73) Assignee: Air Products and Chemicals, Inc., Allentown, PA (US)

( * ) Notice: Subject to any disclaimer, the term of this patent is extended or adjusted under 35 U.S.C. 154(b) by 236 days.

(21) Appl. No.: 10/719,297

(22) Filed: Nov. 21, 2003

(65) Prior Publication Data

US 2004/0129136 A1    Jul. 8, 2004

(30) Foreign Application Priority Data

Nov. 21, 2002  (GB) ................. 0227222.7

(51) Int. Cl.
*B01D 53/047* (2006.01)
(52) U.S. Cl. .............. 95/99; 95/106; 95/114; 95/115; 95/120; 95/123; 95/139; 96/126; 96/130; 96/143; 96/144; 96/146; 96/153
(58) Field of Classification Search .......... 95/99, 95/106, 114, 115, 117–123, 126, 138, 139; 96/126–128, 130, 143, 144, 146, 153, 154
See application file for complete search history.

(56) References Cited

U.S. PATENT DOCUMENTS

| | | | | |
|---|---|---|---|---|
| 1,667,316 A | * | 4/1928 | Hartman et al. | 96/112 |
| 2,075,036 A | * | 3/1937 | Hollis | 62/92 |
| 2,661,808 A | * | 12/1953 | Kahle | 95/115 |
| 2,675,089 A | * | 4/1954 | Kahle | 95/115 |
| 2,765,868 A | * | 10/1956 | Parks | 95/126 |
| 2,801,707 A | * | 8/1957 | Asker | 95/106 |
| 3,193,985 A | | 7/1965 | Siggelin | |
| 3,221,477 A | * | 12/1965 | Arnoldi et al. | 95/26 |
| 3,231,512 A | * | 1/1966 | Harter | 96/126 |
| 3,242,651 A | * | 3/1966 | Arnoldi | 96/127 |
| 3,355,860 A | * | 12/1967 | Arnoldi | 95/102 |
| 4,008,058 A | * | 2/1977 | Wischer et al. | 96/126 |
| 4,425,142 A | * | 1/1984 | Mann | 95/106 |
| 4,601,114 A | | 7/1986 | Noguchi | |
| 4,699,635 A | * | 10/1987 | Norback | 502/34 |

(Continued)

FOREIGN PATENT DOCUMENTS

EP    1072302 A1    1/2001

(Continued)

OTHER PUBLICATIONS von Gemmingen, U. "Designs of Adsorptive Driers in Air Separation Plants"—Reports on Science and Technology—54/1994 (Linde).

*Primary Examiner*—Robert A. Hopkins
(74) *Attorney, Agent, or Firm*—Willard Jones, II

(57) ABSTRACT

An adsorber vessel for use in the adsorption of a component from a gas and subsequent regeneration by thermally induced desorption of the component comprises an inlet for regeneration gas having an inlet nozzle containing at least one heater element, and an outlet for regeneration gas, the inlet and outlet for regeneration being separated by a flow path including a flow chamber containing a body of adsorbent, and wherein the body of adsorbent has a first end which is adjacent the inlet for regeneration gas and a second end which is remote from the inlet for regeneration gas, and the or each heater element is located so as not to penetrate through the first end of the body of adsorbent.

10 Claims, 4 Drawing Sheets

U.S. PATENT DOCUMENTS

| | | | |
|---|---|---|---|
| 4,721,846 A * | 1/1988 | Lupoli et al. | 219/206 |
| 4,862,813 A | 9/1989 | Levin et al. | |
| 4,864,103 A * | 9/1989 | Bishop et al. | 96/141 |
| 5,147,420 A * | 9/1992 | Claesson | 95/113 |
| 5,181,942 A * | 1/1993 | Jain | 95/45 |
| 5,213,593 A | 5/1993 | White, Jr. | |
| 5,230,719 A * | 7/1993 | Berner et al. | 96/144 |
| 5,238,052 A * | 8/1993 | Chagnot | 165/8 |
| 5,614,000 A | 3/1997 | Kalbassi et al. | |
| 5,768,897 A * | 6/1998 | Rainville et al. | 62/94 |
| 5,768,987 A | 6/1998 | Saalasti | |
| 5,855,650 A | 1/1999 | Kalbassi et al. | |
| 5,948,142 A * | 9/1999 | Holmes et al. | 95/99 |
| 6,226,888 B1 * | 5/2001 | Lang | 34/332 |
| 6,299,670 B1 * | 10/2001 | Applegarth | 95/114 |
| 6,524,544 B1 * | 2/2003 | Alvarez et al. | 423/352 |

FOREIGN PATENT DOCUMENTS

| | | |
|---|---|---|
| FR | 2 683 157 A1 * | 5/1993 |
| GB | 871750 | 6/1961 |
| GB | 1 469 720 | 4/1977 |
| JP | 55-79027 A * | 6/1980 |
| JP | 1-203022 A * | 8/1989 |
| JP | 1-207115 A * | 8/1989 |
| JP | 3-260532 A * | 11/1991 |
| JP | 4-200717 A * | 7/1992 |
| JP | 5-4015 A * | 1/1993 |
| JP | 5-7722 A * | 1/1993 |
| JP | 5-168840 A * | 7/1993 |
| JP | 5-200235 A * | 8/1993 |
| WO | WO 96/14917 | 5/1996 |

* cited by examiner

APPARATUS FOR USE IN REGENERATING ADSORBENT

BACKGROUND OF THE INVENTION

The present invention relates to adsorber vessels for use in the adsorption of components from gases and subsequent regeneration of the adsorbent by thermally induced desorption of adsorbed components. It further relates to apparatus for use in the removal of components from gas mixtures by swing adsorption including temperature swing adsorption and related techniques and thermally assisted pressure swing adsorption as well as methods for the operation of such apparatus, including the pre-purification of air prior to cryogenic distillation.

It is necessary in a number of circumstances to remove gas components from a gas stream by adsorption on a solid adsorbent, with periodic regeneration of the adsorbent. The removed gas components may be of intrinsic value or they may be contaminating components in the gas mixture.

In such methods the gas stream is conventionally fed in contact with a solid adsorbent contained in an absorber vessel to adsorb the component or components to be removed and these gradually build-up in the adsorbent. The concentration of the removed component or components in the adsorbent gradually rises and if the process is continued for a sufficient period, the adsorbed components will break through the downstream end of the adsorbent bed. Before this occurs, it is necessary to regenerate the adsorbent.

In a pressure swing adsorption (PSA) system, this is done by stopping the flow into the adsorbent of gas to be treated, depressurising the adsorbent and, usually, by passing a flow of regenerating gas low in its content of the component adsorbed on the bed through the bed counter-current to the product feed direction. Optionally, some heat may be added to the regenerating gas flow but normally the aim is to commence regeneration before the heat produced by adsorption of the adsorbed component on the adsorbent bed has progressed out of the adsorbent containing vessel.

The direction of the heat pulse is reversed by the process of regeneration and the heat which derived from the adsorption of the gas component in question is used for desorbing that component during regeneration. This at least largely avoids the need to add heat during the regeneration step.

An alternative procedure is known as temperature swing adsorption (TSA). In TSA, the cycle time is extended and the heat pulse mentioned above is allowed to proceed out of the downstream end of the adsorbent bed during the feed or on-line period. To achieve regeneration it is therefore necessary to supply heat to desorb the adsorbed gas component. To this end, the regenerating gas used is heated for a period to produce a heat pulse moving through the bed counter-current to the normal feed direction. This flow of heated regenerating gas is usually followed by a flow of cool regenerating gas which continues the displacement of the heat pulse through the bed towards the upstream end. TSA is characterised by an extended cycle time as compared to PSA. A variant of TSA is described by von Gemmingen, U. in "Designs of Adsorptive Driers in Air Separation Plants"—Reports on Technology 54–94—(Linde) using lower than normal temperatures, i.e. 80° to 130° C. and short cycle times.

A modification of the classical TSA process which is known as TPSA is described in U.S. Pat. No. 5,855,650. Here, the regenerating gas is heated during a period of regeneration such that the heat added to the regenerating gas is no more than 90 percent of the heat of adsorption liberated during the adsorption of the gas components which are adsorbed. Regeneration is continued after the ending of heating of the regenerating gas to continue to desorb the adsorbed gas stream component.

A further variant on the TSA process known as TEPSA is described in U.S. Pat. No. 5,614,000. Here, two different gas components such as water and carbon dioxide are adsorbed during the on-line period. A heated regenerating gas is fed during regeneration counter-current to the feed direction to produce a heat pulse travelling in the counter-current direction to desorb the less strongly adsorbed of the two adsorbed components. Heating of the regenerating gas is then terminated and feeding of the regenerating gas continues to allow the more strongly adsorbed component to be desorbed by pressure swing desorption, the regenerating gas being fed at a pressure lower than the pressure during the on-line period.

Whilst the present invention is of relevance to classical TSA systems, it is particularly suitable for use with TPSA or TEPSA systems where usually the period for which the regenerating gas is heated is reduced in comparison to classical TSA systems.

Usually in systems of the kind described above, at least two adsorber vessels are present and are connected in parallel. At any given time, one of these is on-line to adsorb one or more components from a feed gas stream whilst the other is being regenerated or is waiting for regeneration or to come back on-line. The adsorbent containing vessels are each connected through a first manifold to a source of gas which is to be purified. The downstream ends of the adsorbent vessels are similarly connected via a second manifold to a source of regenerating gas.

The usual arrangement has been for a heater for the regenerating gas to be provided at a location which is down-stream of the second manifold in the product feed direction (upstream in the regenerating gas feed direction) so that it serves to provide heated gas to either of the two adsorber vessels as required.

An alternative arrangement is to provide a heater inside each of the adsorber vessels upstream of or within the adsorbent (see U.S. Pat. No. 5,213,593, WO 96/14917 and U.S. Pat. No. 3,193,985 as typical examples). Such a heater may extend through an internal pipe running from one end of the vessel to close to the other end.

As we have now appreciated, both of these arrangements have significant disadvantages. Where a common heater is positioned on the other side of a manifold connecting to both adsorber vessels, it takes a considerable period of time for gas heated in the heater to reach and begin to heat the adsorbent in the beds. Allowance must be made not only for the time required for the gas to be passed from the heater to the adsorbent beds but also for the provision of extra heat due to the need for the gas to heat up all of the intervening pipe and valve work before the full temperature of the heated regenerating gas begins to be applied to the adsorbent. This is of particular concern where the period during which the regeneration gas is heated is relatively short as in TPSA and TEPSA type systems.

On the other hand, where the heater is installed in the adsorbent containing vessel itself this gives rise to difficulties in access for heater maintenance and difficulties in filling the adsorber vessels with adsorbent. It also gives rise to difficulty due to lack of mixing, maldistribution and less than optimum heat transfer in ensuring that each particle of adsorbent is heated to an adequate temperature for full regeneration. Adsorbent materials are not characterised by high thermal conductivity and the heat transfer coefficient between the gas and the adsorbent is poor. Various types of heater have been used inside adsorber vessels including microwave radiation, electric heater elements, external heating jackets with radial fins protruding into the vessel interior and the use of axially extending Curie point heaters. However, all of these direct heating methods suffer from the difficulties discussed above.

EP 1072302 A discloses an arrangement in which a tube having catalytic material in porous walls depends from the body of a chamber containing a heater. Regeneration gas is passed into the chamber to heat and flow through the catalytic material.

BRIEF SUMMARY OF THE INVENTION

The present invention now provides an adsorber vessel for use in the adsorption of a component from a gas and subsequent regeneration by thermally induced desorption of said component, said vessel comprising an inlet for regeneration gas having an inlet nozzle containing at least one heater element, and an outlet for regeneration gas, said inlet and outlet for regeneration gas being separated by a flow path including a flow chamber containing a body of adsorbent, and wherein said body of adsorbent has a first end which is adjacent said inlet for regeneration gas and a second end which is remote from said inlet for regeneration gas, and the or each heater element is located so as not to penetrate through said first end of the body of adsorbent. The cross sectional area of the nozzle is such that in use when gas is passed from the inlet through the vessel to escape via the outlet, the ratio of the gas velocity through the nozzle to the superficial vessel velocity is greater than 1.5, e.g. is 2.8 and preferably is about 4.

The velocity of gas flow through the nozzle is calculated on the basis of the volume flow rate of the gas and the cross sectional area of the nozzle, being its overall cross-section size less the space occupied by heater elements therein.

Superficial vessel velocity in this context is the gas velocity calculated on the basis of the volume flow rate of the gas through the adsorbent vessel and the cross sectional area of the flow path of the gas through the vessel, ignoring the presence of adsorbent therein.

The ratio of the gas velocity over the heater elements to the superficial vessel velocity in the adsorber vessel further differentiates the preferred arrangement according to the invention from the use of heater elements within the adsorber vessels and provides improved mixing and uniformity of the heating of the regenerating gas, and hence the adsorbent, providing a high heat transfer co-efficient between the heater elements and the regenerating gas.

The location of the heater elements within an inlet nozzle connecting to the adsorber vessel rather than at a remote location connected to the adsorber vessel via pipe and valve work constituting a manifold ensures that the heat applied to the regenerating gas is much more quickly communicated to the adsorbent in a much better ordered and shaped heat pulse enabling the minimising of the regeneration cycle time.

The regeneration of the adsorbent is suitably carried out using regeneration gas at a temperature above the bed adsorption temperature, suitably as a temperature of 0 to 200° C., preferably 40 to 100° C. The process may be operated with a molar flow ratio of regeneration gas to the feed gas of from 0.05 to 0.8, or more preferably 0.1 to 0.5.

Suitably in a TSA process and a TPSA process, the feed gas is fed to the adsorption zone for a period of 6 to 1,000 mins, and preferably 70 to 300 mins. In a TEPSA process, the feed gas is suitably fed to the adsorption zone for a period of 10 to 200 mins and preferably 20 to 120 mins, depending on the purge gas availability.

Preferably in a vessel of the invention, the distance from said at least one heater element to the adsorbent in the vessel is no more than 2.5 metres, more preferably no more than 1.5 metres, e.g. about 0.5 metres.

The invention includes, apparatus for use in the removal of at least one component from a gas mixture by a swing adsorption process having an adsorbent regeneration phase, said apparatus comprising:

an adsorber vessel comprising an inlet for said gas mixture and an outlet for purified gas separated by a flow path including a flow chamber containing a body of adsorbent, and having an inlet for regeneration gas and an outlet for regeneration gas separated by a flow path including said flow chamber, said inlet for said gas mixture and said outlet for purified gas optionally constituting also said outlet for regeneration gas and said inlet for regeneration gas, said inlet for regeneration gas having an inlet nozzle containing at least one heater element, wherein said body of adsorbent has a first end which is adjacent said inlet for regeneration gas and a second end which is remote from said inlet for regeneration gas, and the or each heater element is located so as not to penetrate through said first end of the body of adsorbent, a source of gas mixture to be separated connected to said inlet for gas mixture, a source of regeneration gas connected to said inlet for regeneration gas, and control means for operating a cycle of adsorption and regeneration in which:

gas mixture is passed over said adsorbent in a first flow direction and is purified by the adsorption of at least one component and flow of the gas mixture over the adsorbent is stopped, regeneration gas is passed over the adsorbent in the same or in an opposite flow direction, said regeneration gas being heated by said heater element, and flow of the regeneration gas is stopped and flow of the gas mixture is resumed.

Preferably, such apparatus comprises two or more said adsorption vessels arranged in parallel for operation such that at least one said vessel is online for adsorption whilst at least one other said vessel is being regenerated.

Said control means preferably operates said apparatus to perform TSA, TEPSA, or TPSA.

The invention further provides a swing adsorption method of removing at least one component from a gas mixture, said method comprising:

in an adsorption phase, passing said gas mixture in a first direction into an adsorber vessel comprising an inlet for said gas mixture and an outlet for purified gas separated by a flow path including a flow chamber containing a body of adsorbent, and having an inlet for regeneration gas and an outlet for regeneration gas separated by a flow path including said flow chamber, said inlet for said gas mixture and said outlet for purified gas optionally constituting also said outlet for regeneration gas and said inlet for regeneration gas, said inlet for regeneration gas having an inlet nozzle containing at least one heater element, wherein said body of adsorbent has a first end which is adjacent said inlet for regeneration gas and a second end which is remote from said inlet for regeneration gas, and the or each heater element is located so as not to penetrate through said first end of the body of adsorbent, so that said gas mixture is purified by the adsorption of at least one component and after a period stopping said flow of the gas mixture into said vessel, and in a regeneration phase, passing regeneration gas into said vessel through said inlet for regeneration gas in the same or in an opposite flow direction whilst heating said regeneration gas by said heater element for a period, stopping said flow of the regeneration gas and resuming said flow of the gas mixture.

Said heating is preferably continued in the regeneration phase for a period not exceeding 90 minutes (suitable for TEPSA), optionally not exceeding 60 minutes, e.g. not exceeding 30 minutes (both suitable for TPSA).

The distance between the heater element or elements and the adsorbent is preferably such that the heat pulse transit time between the most downstream point of the heater element or elements and the adsorbent is no more than 4 minutes.

Preferably, upon initiating a constant rate of heating of the regeneration gas, the regeneration gas immediately upstream of the adsorbent reaches an essentially steady state temperature within no more than 1 minute.

Suitably, the gas which is purified is air and the components removed by adsorption comprise water and carbon dioxide.

The invention includes a method of air separation by cryogenic distillation to produce an oxygen rich gas and a nitrogen rich gas, comprising a pre-purification of the air to remove at least carbon dioxide and water which is conducted by a swing adsorption method described above.

DETAILED DESCRIPTION OF THE INVENTION

The invention will be further described and illustrated with reference to the accompanying drawings in which.

Although the invention is broadly applicable to the separation of gas components from gas mixtures by a swing adsorption process, we shall exemplify it in the following description by reference to the pre-purification of air by the removal of water, carbon dioxide and other more minor contaminants prior to cryogenic air separation.

The cryogenic purification of air requires a pre-purification step for the removal of both high boiling and hazardous materials. Principal high boiling air components include water and carbon dioxide. If removal of these impurities from ambient air is not achieved, then water and carbon dioxide will freeze out in cold sections of the separation process (including heat exchangers and the liquid oxygen sump) causing pressure drop, flow problems and operational problems. Various hazardous materials also have to be removed including acetylene, nitrous oxide and other hydrocarbons. The high boiling hydrocarbons are a problem because they will concentrate in the LOX section of the distillation column, resulting in a potential explosive hazard.

Typically, the pre-purification of air is carried out by adsorption clean-up processes which may include TSA or PSA.

Figure 1:
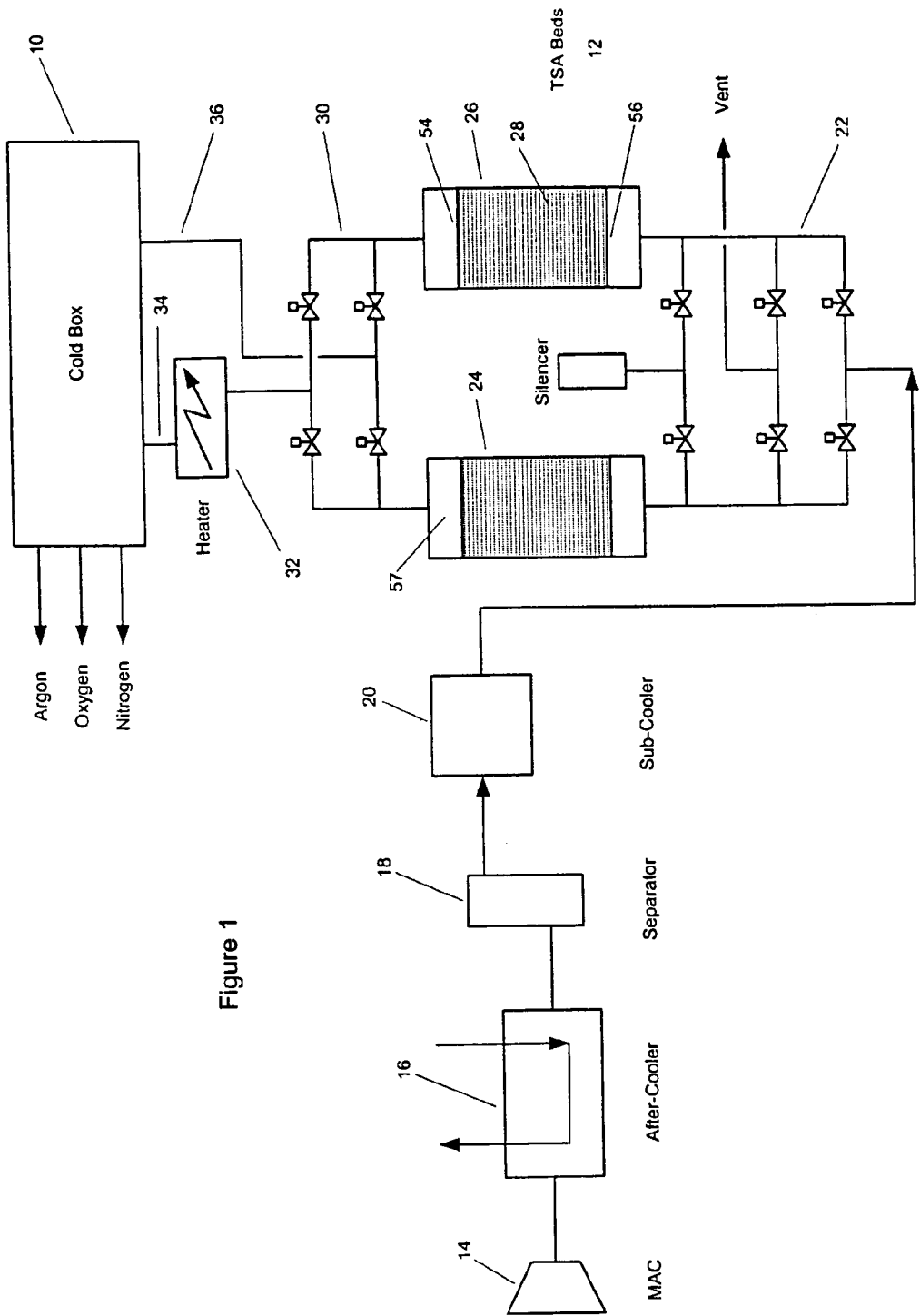
FIG. 1 shows a typical TSA pre-separation purification unit attached to a cryogenic air separation apparatus.

TSA processes require a regeneration gas stream to be heated to a temperature above ambient. Historically, these processes can involve a regenerating gas temperature of 150° C. or greater. A typical arrangement is for a regeneration heater to be installed shared between adsorber vessels and connected to them by an arrangement of pipes and valves generally as shown in FIG. 1.

Here, an air separation plant comprises a cryogenic distillation section 10 and a pre-purification section 12. The pre-purification section comprises a main air compressor 14 feeding compressed air to an after cooler 16 which causes ambient water to condense out of the compressed and cooled air which is removed in a separator 18 before the compressed air is further cooled in a sub-cooler 20. The cooled compressed air is fed to an inlet manifold assembly 22 connecting the up-stream ends of each of two identical adsorber vessels 24, 26. Each of these contains one or more layers of solid adsorbent forming an adsorbent bed 28 which has a first end 54 and an opposite end 56. A plenum 57 is provided above the bed 28 and a similar plenum is provided below bed 28. The adsorber vessels 24, 26 are connected at their upper or downstream ends by a down-stream manifold assembly 30. Downstream from the manifold 30 is a heater 32 connected to receive a flow of dry gas, e.g. nitrogen from the cryogenic separation unit 10 via a line 34. Purified compressed air is fed from the pre-purification section 12 to the cryogenic separation section 10 via a line 36.

In use, compressed air is fed through the inlet manifold 22 to one of the two beds 24, 26 in which water, carbon dioxide and other contaminants are adsorbed. The purified air passes via the manifold 30 at line 36 into the cryogenic air separation unit 10. At an appropriate time after adsorption has continued for a sufficient period, the flow of inlet air is switched to the other of the two adsorber vessels 24, 26 using the inlet manifold 22. A flow of gas, e.g. nitrogen is then passed through the line 34 to the heater 32 and through the outlet manifold 30 to the bed which was previously on-line. The period during which the regeneration gas is heated will depend upon whether the process is being operated as a pure TSA process or as one of its variants such as TPSA or TEPSA.

Figure 2:
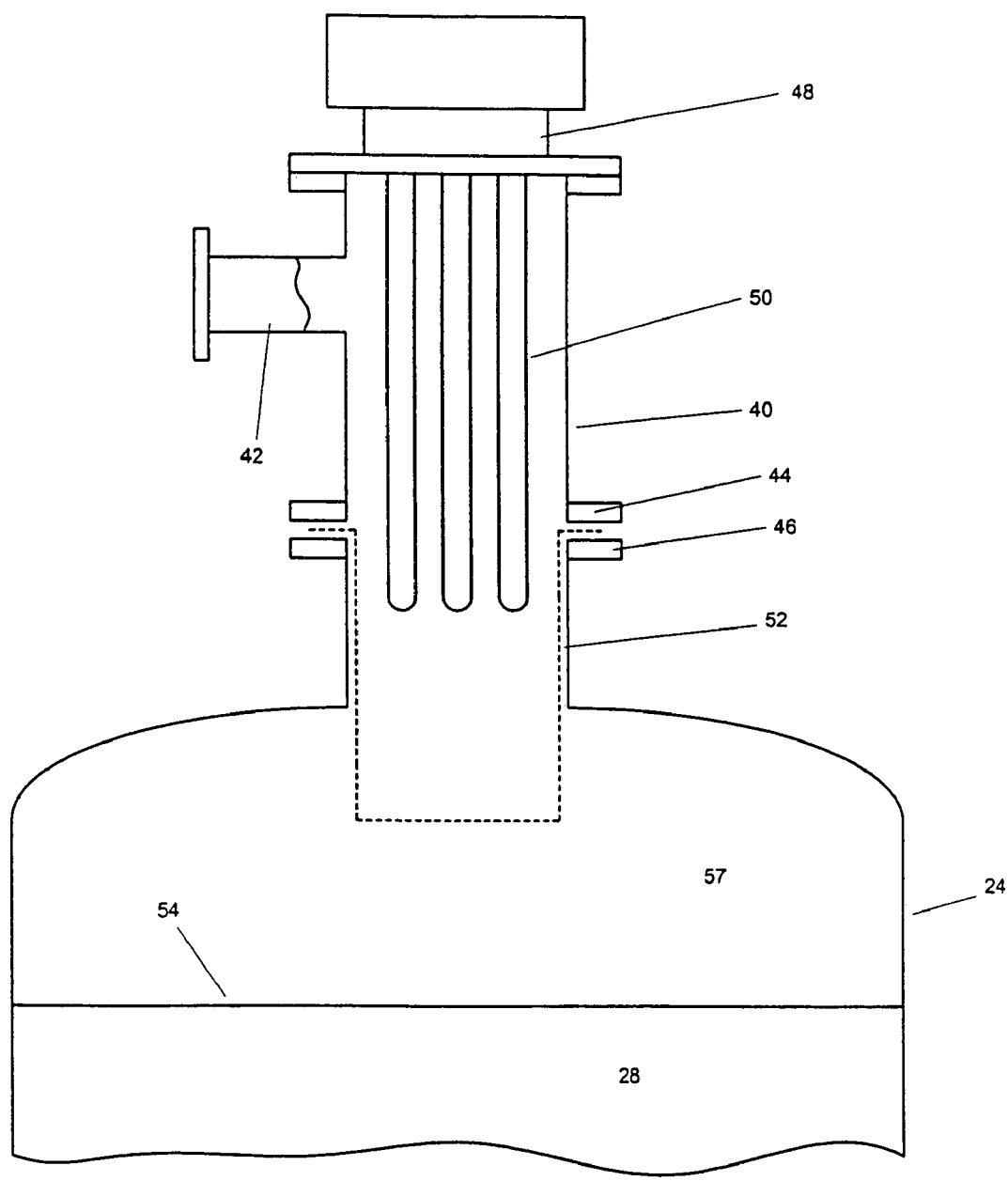
FIG. 2 shows a schematic longitudinal cross-sectional view of one end of an adsorber vessel according to the invention.

According to the improvement provided by the invention, the heater 32 is removed and each of the two adsorber vessels is provided with a heater contained within an inlet nozzle for regenerating gas at the product flow downstream end of the adsorber vessel as shown in FIG. 2. Here, vessel 24 is shown equipped with a nozzle 40 adjacent the first end 54 of the adsorbent 28 and having an inlet arm 42 and a flanged outlet 44 which is mated to a flange 46 at the mouth of the adsorber vessel 24. Within the main section of the nozzle 40 is provided a heater unit 48 having a plurality of finger-like heater elements 50 extending parallel to one another and at right-angles to the inlet arm 42 and generally parallel to the axis of the adsorber vessel 24.

A distributor or filter assembly 52 is mounted between the flanges 44, 46 and extends down below the ends of the heater elements. The heater elements terminate short of the top end 54 of the adsorbent bed 28.

When the vessel 24 is to be regenerated, regeneration gas is fed to the inlet 42 through the manifold 30 and the heater 48 is switched on to heat the regenerating gas as it passes through the nozzle.

This results in an immediate and even heating of the regenerating gas as it enters the adsorber vessel 24.

Figure 3:
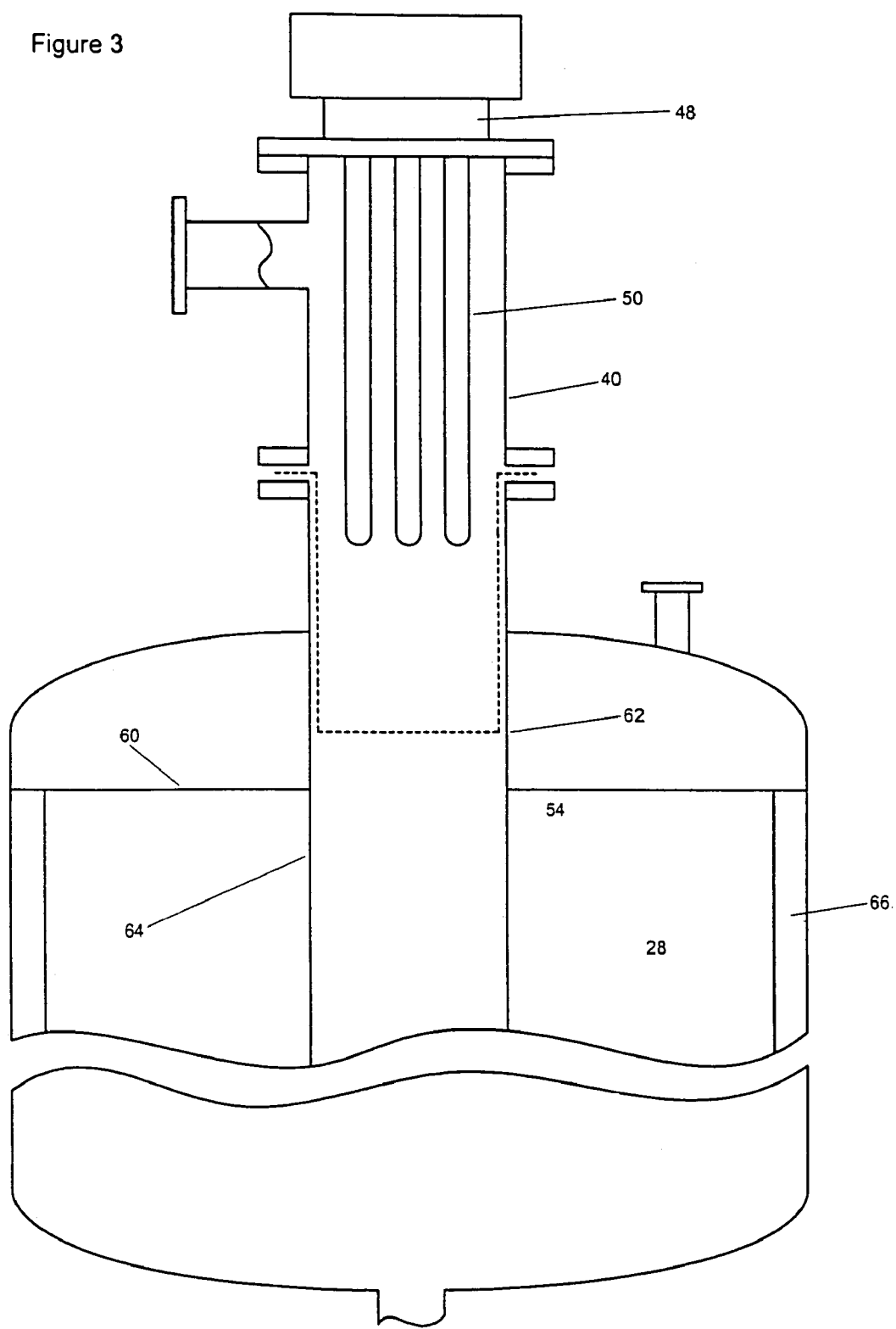
FIG. 3 shows in a manner similar to FIG. 2 a variant of the apparatus of FIG. 2 in which the adsorbent bed is a radial flow bed.

As shown in FIG. 3, an alternative embodiment is similar except that the adsorbent bed is configured for radial flow rather than the axial flow of FIG. 2. The adsorbent is positioned below an annular wall 60 at the first end 54 of the adsorbent bed 28. From the nozzle 40, an axially running tube 62 extends down through the bed of adsorbent and within the bed is provided with wall perforations 64. Tube 62 terminates at a blanking plate (not shown) closing the second end of the bed, which blanking plate has apertures around its edge allowing gas passage into and from an annular space 66 radially outward of the adsorbent bed communicating with a plenum space below the adsorbent bed from which leads an outlet for regenerating gas (also serving as an inlet for gas to be purified). Alternatively, as known in the art, the communication from and to space 66 may be to the plenum 57 and an outlet/inlet may be provided in the wall of the vessel communicating with that plenum.

In use, gas to be purified passes into the vessel through the inlet for feed gas (not shown), radially inwards through the adsorbent, into the tube 62 and out through the nozzle 40: For regeneration, regenerating gas is introduced via the nozzle 40, being heated by the elements 50, passes down through the tube 62 and into the adsorbent bed 28 via the perforations 64. The regeneration gas is recovered from the annular space 66 and is discharged via the outlet for regeneration gas.

Figure 4:
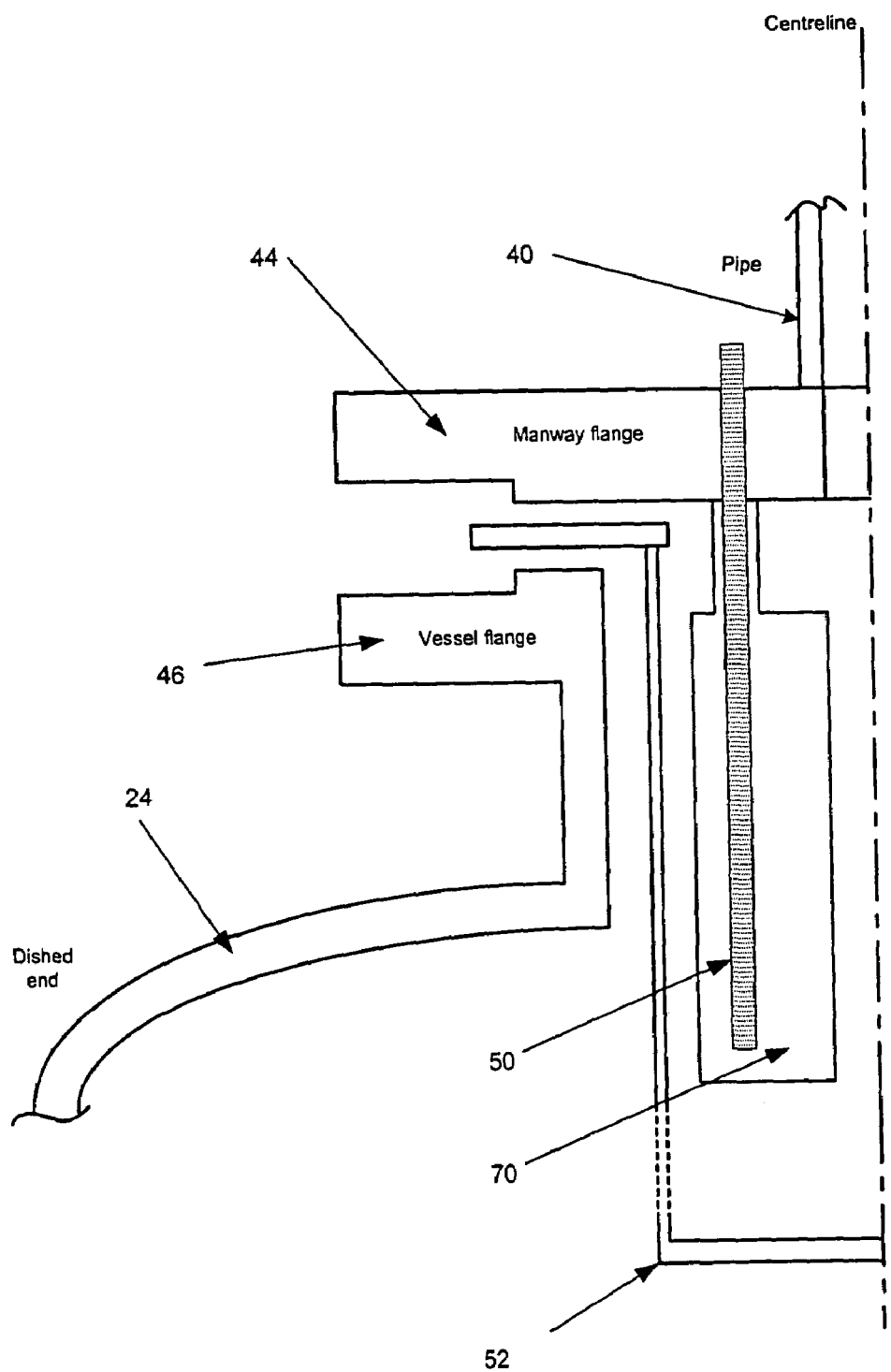
FIG. 4 shows in half section a variant of the apparatus of FIG. 2 employing an alternative type of heater.

In FIG. 4, the nozzle 40 takes the form of a pipe connected to a supply of regeneration gas and to a gas separation unit, which pipe terminates at a flange 44 from which depend a number of pressure tight, heating fins 70 within which are positioned respective heating elements 50. When these are energized, heat will be transferred from the elements 50 into the heating fins. These being located in a region of high flow velocities will be efficient in transferring heat to the regeneration gas. Due to high turbulence in the heater the gas will be well mixed. if the filter assembly 52 is included, which is optional, additional mixing will occur. Thus, the adsorbent bed will be subjected to regeneration gas flow at a homogeneous temperature.

The heat source for the heating elements may be of various kinds, including electric resistance heaters, microwaves, and steam.

Advantages of the invention as illustrated include the avoidance of expense associated with a separate heater pressure vessel and the thermal installation of pipe, valves and the adsorber vessels themselves which in the scheme of FIG. 1 also needs to be heated to regeneration gas temperature each time that heating is required. Furthermore, the uneven heating and other operational difficulties associated with heater elements within adsorber vessels discussed earlier are avoided.

By way of illustration, supposing a flow of 2700 Nm$^3$/hr (normal cubic metres per hour) of nitrogen as regenerating gas at 1.1 bara through a pipe of diameter 0.21 m over a distance of 11 m from a heater to an adsorbent vessel, the gas residence time would be 5 seconds, but the heat pulse residence time (i.e. the time for the regenerating gas arriving at the vessel to come up to full temperature) would be 12 minutes. At 7 m from the heater to the vessel the heat pulse residence time would be 10 minutes. However, using the schemes according to the invention as illustrated, the heat pulse residence time would be essentially zero.

The invention can be applied to vessel geometries other than those illustrated, e.g. to horizontal as well as vertical adsorption beds, and to beds in which the regeneration flow is upwards rather than downwards as shown in FIG. 2.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than to mean 'consisting of'.

The invention claimed is:

1. Apparatus for use in the removal of at least two components including a less strongly adsorbed component and a more strongly adsorbed component from a gas mixture by a TEPSA swing adsorption process having an adsorbent regeneration phase, said apparatus comprising:

an adsorber vessel comprising an inlet for said gas mixture and an outlet for purified gas separated by a flow path including a flow chamber containing a body of adsorbent, and having an inlet for regeneration gas and an outlet for regeneration gas separated by a flow path including said flow chamber, said inlet for said gas mixture and said outlet for purified gas optionally constituting also said outlet for regeneration gas and said inlet for regeneration gas, said inlet for regeneration gas having an inlet nozzle containing at least one heater element, wherein said body of adsorbent has a first end which is adjacent said inlet for regeneration gas and a second end which is remote from said inlet for regeneration gas, and the at least one heater element is located so as not to penetrate through the first end of the body of adsorbent, a source of gas mixture to be separated connected to the inlet for gas mixture, a source of regeneration gas connected to the inlet for regeneration gas, and control means for operating a TEPSA cycle of adsorption and regeneration in which:

gas mixture is passed over the adsorbent in a first flow direction and is purified by the adsorption of at least two components and flow of the gas mixture over the adsorbent is stopped, regeneration gas is passed over the adsorbent in an opposite flow direction, the regeneration gas being heated by the at least one heater element so as to desorb the less strongly adsorbed component, heating of said regeneration gas is terminated end regeneration gas at a lower pressure than a pressure during the adsorption phase is continued to be passed over the adsorbent so as to desorb the more strongly adsorbed component, and flow of the regeneration gas is stopped and flow of the gas mixture is resumed.

2. Apparatus as claimed in claim 1, comprising one or more additional adsorption vessels arranged in parallel with the adsorption vessel of claim 4 for operation such that at least one of such vessels is online for adsorption whilst at least one other of such vessels is being regenerated.

3. A TEPSA swing adsorption method of removing at least two components including a less strongly adsorbed component and a more strongly adsorbed component from a gas mixture, said method comprising:

in an adsorption phase, passing said gas mixture in a first direction into an adsorber vessel comprising an inlet for said gas mixture and an outlet for purified gas separated by a flow path including a flow chamber containing a body of adsorbent, and having an inlet for regeneration gas and an outlet for regeneration gas separated by a flow path including said flow chamber, said inlet for said gas mixture and said outlet for purified gas optionally constituting also said outlet for regeneration gas and said inlet for regeneration gas, said inlet for regeneration gas having an inlet nozzle containing at least one heater element, wherein said body of adsorbent has a first end which is adjacent said inlet for regeneration gas and a second end which is remote from said inlet for regeneration gas, and the at least one heater element is located so as not to penetrate through said first end of the body of adsorbent, so that said gas mixture is purified by the adsorption of at least two components and after a period stopping the flow of the gas mixture into the vessel, and in a regeneration phase, passing regeneration gas into the vessel through the inlet for regeneration gas in an opposite flow direction whilst heating said regeneration gas by the at least one heater element for a period so as to desorb the less strongly adsorbed component, terminating heating of said regeneration gas and continuing to pass regeneration gas at a lower pressure than pressure during the adsorption phase so as to desorb the more strongly adsorbed component, stopping said flow of the regeneration gas and resuming said flow of the gas mixture.

4. A method as claimed in claim 3, wherein said heating is continued in the regeneration phase for a period not exceeding 90 minutes.

5. A method as claimed in claim 4, wherein the heating is continued in the regeneration phase for a period not exceeding 60 minutes.

6. A method as claimed in claim 4, wherein said heating is continued for a period not exceeding 30 minutes.

7. A method as claimed in claim 3, wherein the distance between the at least one heater element and the adsorbent is such that the transmit time between the most downstream point of the heater element or elements and the adsorbent is no more than 4 minutes.

8. A method as claimed in claim 3, wherein upon initiating a constant rate of heating of the regeneration gas, the regeneration gas immediately upstream of the adsorbent reaches an essentially steady state temperature within no more than 1 minute.

9. A method as claimed in claim 3, wherein the gas is air and the components removed by adsorption comprise water and carbon dioxide.

10. A method of air separation by cryogenic distillation to produce an oxygen rich gas and a nitrogen rich gas, comprising a pre-purification of the air to remove at least carbon dioxide and water which is conducted by a TEPSA swing adsorption method as claimed in claim 3.

* * * * *

UNITED STATES PATENT AND TRADEMARK OFFICE
CERTIFICATE OF CORRECTION

PATENT NO.        : 7,066,986 B2
APPLICATION NO.  : 10/719297
DATED             : June 27, 2006
INVENTOR(S)       : Christopher Richard Haben et al.

It is certified that error appears in the above-identified patent and that said Letters Patent is hereby corrected as shown below:

Column 8, Line 43 (Claim 1)
  Replace the word "end" with the word -- and -- after "gas is terminated".

Column 9, Line 23 (Claim 4)
  Replace the word "beating" with the word -- heating -- after "A method as claimed in claim 3, wherein said"

Signed and Sealed this

Twelfth Day of September, 2006

JON W. DUDAS
*Director of the United States Patent and Trademark Office*